(12) United States Patent
Young, Sr.

(10) Patent No.: US 9,104,674 B1
(45) Date of Patent: Aug. 11, 2015

(54) SYSTEM, METHOD AND COMPUTER PROGRAM PRODUCT FOR TIME SHARING ACCESS CONTROL TO DATA

(75) Inventor: Thomas Edward Young, Sr., Winston-Salem, NC (US)

(73) Assignee: INMAR, INC., Winston-Salem, NC (US)

(*) Notice: Subject to any disclaimer, the term of this patent is extended or adjusted under 35 U.S.C. 154(b) by 765 days.

(21) Appl. No.: 12/760,383

(22) Filed: Apr. 14, 2010

(51) Int. Cl.
G06F 17/30 (2006.01)

(52) U.S. Cl.
CPC .............................. *G06F 17/30067* (2013.01)

(58) Field of Classification Search
CPC ........................... G06F 17/30067; G06F 9/466
USPC ........................................................ 707/694
See application file for complete search history.

(56) References Cited

U.S. PATENT DOCUMENTS

| | | | |
|---|---|---|---|
| 5,551,027 A | 8/1996 | Choy et al. | |
| 5,701,457 A | 12/1997 | Fujiwara | |
| 5,850,522 A | 12/1998 | Wlaschin | |
| 5,857,180 A | 1/1999 | Hallmark et al. | |
| 5,870,743 A * | 2/1999 | Cohen et al. | 1/1 |
| 5,878,409 A | 3/1999 | Baru et al. | |
| 6,438,558 B1 | 8/2002 | Stegelmann | |
| 6,470,331 B1 | 10/2002 | Chen et al. | |
| 6,691,166 B1 | 2/2004 | Gasior et al. | |
| 6,754,656 B1 | 6/2004 | Cornwell et al. | |
| 7,185,003 B2 | 2/2007 | Bayliss et al. | |
| 7,188,113 B1 | 3/2007 | Thusoo | |
| 2002/0099613 A1* | 7/2002 | Swart et al. | 705/26 |
| 2004/0098383 A1* | 5/2004 | Tabellion et al. | 707/3 |
| 2005/0177553 A1 | 8/2005 | Berger et al. | |

FOREIGN PATENT DOCUMENTS

JP 10222222 A * 8/1998

OTHER PUBLICATIONS

Zeller et al. "Experience Report: Exploiting Advanced Database Optimization Features for Large-Scale SAP R/3 Installations." Proceedings of the 28th International Conference on Very Large Data Bases, Aug. 2002, Hong Kong, China.
Lin et al. An Efficient Partition and Matching Algorithm for Query-Set-based Broadcasting in Multiple Channel Mobile Environment: Wseas Transactions on Communications, vol. 8, Issue 1, Jan. 2009.
Wah et al "Query Processing in E-Commerce Environment using Threashold Values." International Conference on E-Commerce, Malaysia, Juala Lumpur, Nov. 2000.
Chakrabarti, et al. "Resource Scheduling for Parallel Database and Scientific Applications." Proceedings of the Eighth Annaul ACM Symposium on Parallel Algorithms and Architectures. 1996.

* cited by examiner

*Primary Examiner* — Sangwoo Ahn
(74) *Attorney, Agent, or Firm* — Allen, Dyer, Doppelt, Milbrath & Gilchrist, P.A.

(57) ABSTRACT

A system, a method, and computer program product is disclosed for time sharing access control to data in a database system and executing a plurality of database processes to avoid contention of the database processes. A data table having a plurality of data groups or partitions is defined via a database management system, and is stored in a computer memory. A plurality of database process/time segments pairs are defined by pairing each of a plurality of database processes with each of a plurality of time segments. The defined pairs are stored in a computer memory. Each of the pairs is associated with at least one of a plurality of data groups or partitions of the data table, and the associations are stored in a computer memory. A request is received by the database management system that one of the database processes be given to access the data table. A time segment for the database process is determined via a computer processor. A database process/time segment pair for the database process is determined by using the determined time segment of the database process. The data group or partition of the data table with which the database process/time segment pair has been associated is determined via a computer processor. Access is allowed to data group or partition of the data table that was determined to be associated with the database process/time segment pair.

21 Claims, 14 Drawing Sheets

SYSTEM, METHOD AND COMPUTER PROGRAM PRODUCT FOR TIME SHARING ACCESS CONTROL TO DATA

FIELD OF THE INVENTION

The present invention generally relates to a computer-based system, method and computer program product for time sharing access control to data in a database management system.

BACKGROUND OF THE INVENTION

The problem of contention among database transactions is known in the art. Contention may be thought of as the competition among various database processes that access a data structure.

Contention for access to a data table occurs, for example, if one process of a computer application program requires that one or more new rows of data be inserted into a data table while another process requires that another row of data be modified. Typically, the processes are performed in the order the processing requests are received by the database management system. If the insert process was first received, therefore, the data table may be "locked" by the database management system for a period of time during which the new rows are being inserted into the data table. While the data table is locked for the insert process, no other database process can access the data table, which slows processing time and is, therefore, undesirable. Locking also increases the overhead (e.g., computer memory and processing capacity) with processing database transactions.

As can be appreciated, the issue of contention becomes more acute as the number of database processes that need simultaneous access to a transactional database at a given time increases. A transactional database, which typically uses one or more staging tables, contains dynamic data, which means the database receives a large number of simultaneous requests to insert new data, or modify or delete existing data, in the database. Thus, a transactional database is inherently contentious. A transactional database can be distinguished from a data warehouse, which stores a large volume of generally static data of a historical nature on a permanent basis. Once data is stored in a data warehouse, it is not typically modified or deleted.

Prior art methods of improving the performance of, and minimizing contention among database processes that need access to large tables used in a data warehouse, rely on partitioning a data table. Partitioning of a database can be thought of as dividing a logical database, or its constituting elements, into distinct independent parts. A database can be partitioned either by building separate smaller databases (each with its own tables, indices, and transaction logs), or by splitting selected elements, for example just one table. "Horizontal partitioning" involves putting different rows into different tables. Horizontal partitions are created by defining a partition key, i.e., selecting a data element or a column of the table, defining one or more partitions, and then defining a range of values found in the selected data element for each partition. For example, customers with ZIP codes less than 50000 are stored in a first partition, e.g., CustomersEast, while customers with ZIP codes greater than or equal to 50000 are stored in a second partition, e.g., CustomersWest.

Compared to a data warehouse, transactional databases include relatively dynamic data and do not typically include large volumes of data in a single table. Thus, known partitioning methods are not indicated for reducing contention and improving throughput in transactional databases. Furthermore, because of the dynamic nature of the data in a transactional database, prior art methods of partitioning are not suitable due to the inherent difficulties associated with selection of a proper partition key and properly defining the range of values in each partition.

Other prior art approaches to minimizing contention in a high volume transactional database include queuing and process scheduling. The disadvantage of both of these approaches, however, is that the amount of time to process the requested transactions increases linearly, if not exponentially, as the number of queued or scheduled requests increases. Thus, if immediate processing of a high volume of database transactions is required, such approaches do not yield acceptable results.

Thus, what is needed is a computer implemented system and method, and a computer program product, for immediately processing a high volume of contentious database transactions without the disadvantages associated with the prior art methods.

SUMMARY OF THE INVENTION

A computer implemented system and method, and a computer program product, for controlling access to data in a database management system to allow concurrent access to the data and to minimize contention of simultaneous database processes is disclosed. In an embodiment, a data table is defined via the database management system, the data table being comprised of a plurality of data groups, and the data table is stored in a computer memory. A plurality of database process/time segments pairs are defined and stored in a computer memory, each of the plurality of database process/time segments pairs being defined by pairing each of a plurality of database processes with each of a plurality of time segments. Each of the plurality of database process/time segment pairs are associated with at least one of a plurality of data groups of the data table and stored in computer memory so that, during any of the plurality of time segments, each of the plurality of database processes can access only one of the plurality of data groups of the data table and each of the plurality of data groups of the data table is accessed by only one of the plurality of database processes.

A data control table having a plurality of data elements, the plurality of data elements being comprised of a database process, a time segment and a data group, is defined and stored in a computer memory. Each of the database process/time segment pairs is stored in the data control table, and each of the associations between each of the plurality of the database process/time segment pairs and each of the plurality of data groups is stored in the data control table. The data table may be a staging table and may be a transactional data table that is accessed by a plurality of database processes.

In another embodiment, a data table is defined via a database management system, the data table being comprised of a plurality of data groups, and the data table is stored in a computer memory. A plurality of data group/time segments pairs, each of the plurality of data group/time segments pairs being defined by pairing each of a plurality of data groups with each of a plurality of time segments, is defined and stored in a computer memory. Each of the plurality of data group/time segment pairs is associated with at least one of a plurality of database processes and the association is stored in a computer memory.

In another embodiment, a plurality of data group/time segments pairs, each of the plurality of data group/time segments pairs being defined by pairing each of a plurality of data groups with each of a plurality of time segments, are defined and stored in a computer memory. Each of the plurality of data group/time segment pairs is associated with at least one of a plurality of database processes and the association is stored in a computer memory.

In another embodiment, a plurality of data group/database process pairs, each of the plurality of data group/database process pairs being defined by pairing each of a plurality of data groups with each of a plurality of database processes, are defined and stored in a computer memory. Each of the plurality of data group/database process pairs is associated with at least one of a plurality of time segments and the association is stored in a computer memory.

In still another embodiment, a computer implemented system and method, and a computer program product, for executing a plurality of database processes to avoid contention of the database processes disclosed. A data table is defined via a database management system, the data table being comprised of a plurality of data groups, and stored in a computer memory. A plurality of database process/time segments pairs, each of the plurality of database process/time segment pairs being defined by pairing each of a plurality of database processes with each of a plurality of time segments, are defined and stored in a computer memory. Each of the plurality of database process/time segment pairs is associated with at least one of a plurality of data groups of the data table and the association is stored in a computer memory. A request that one of the plurality of database processes be given to access the data table is received via the database management system. A time segment for the database process for which access to the data table has been requested is determined by a computer processor. A database process/time segment pair for the database process for which access to the data table has been requested is determined by a computer processor, the database process/time segment pair being determined by the time segment of the database processes for which access to the data table has been requested. The one of the plurality of data groups of the data table with which the database process/time segment pair has been associated is determined by a computer processor. Access is then allowed to the one of the plurality of data groups of the data table which was determined to be associated with the database process/time segment pair.

A time segment is determined by determining the runtime of the database process for which access to the data table has been requested. The runtime may be a clock time.

The data table may be comprised of a plurality of rows and the database process may be an insert process. In that case, the runtime of the insert process is determined and the database process/time segment pair for the insert process is determined based on the runtime of the insert process. The data group associated with the determined database process/time segment pair is determined and a row is inserted via the database management system into the data table, wherein the inserted row is comprised of the determined data group associated with the determined database process/time segment pair for the insert process and the determined runtime of the insert process.

The database process may be a modify, read or delete process, in which case the runtime of the modify, read or delete process is determined. The database process/time segment pair for the modify, read or delete process and the determined runtime of the modify, read or delete process is determined. The data group associated with the determined database process/time segment pair is determined. A row is modified, read or deleted via the database management system, the modified, read or deleted row having the data group associated with the determined database process/time segment pair for the modify, read or delete process and the determined runtime of the modify, read or delete process.

In yet another embodiment, a data table is defined via the database management system, the data table being comprised of a plurality of data partitions, and the data table is stored in a computer memory. A plurality of database process/time segments pairs, each of the plurality of database process/time segments pairs being defined by pairing each of a plurality of database processes with each of a plurality of time segments, is defined and stored in a computer memory. Each of the plurality of database process/time segment pairs is associated with at least one of a plurality of data partitions of the data table and the association is stored in a computer memory.

In still another embodiment, a data table is defined via a database management system, the data table being comprised of a plurality of data partitions, and is stored in a computer memory. A plurality of database process/time segments pairs, each of the plurality of database process/time segment pairs being defined by pairing each of a plurality of database processes with each of a plurality of time segments, is defined and stored in a computer memory. Each of the plurality of database process/time segment pairs is associated with at least one of a plurality of data partitions of the data table, and the association is stored in a computer memory. A request that one of the plurality of database processes be given to access the data table is receiving via the database management system. A time segment for the database process for which access to the data table has been requested is determined via a computer processor. A database process/time segment pair for the database process for which access to the data table has been requested, the database process/time segment pair being determined by the time segment of the database processes for which access to the data table has been requested, is determined via a computer processor. The data partition of the data table with which the database process/time segment pair has been associated is determined via a computer processor, and access is allowed to the one of the plurality of data partitions of the data table which was determined to be associated with the database process/time segment pair.

In still another embodiment, a plurality of data tables are defined via the database management system and the plurality of data tables are stored in a computer memory. A plurality of database process/time segments pairs, each of the plurality of database process/time segments pairs being defined by pairing each of a plurality of database processes with each of a plurality of time segments, are defined and stored in a computer memory. Each of the plurality of database process/time segment pairs is associated with at least one of a plurality of data tables and the association is stored in a computer memory.

A request that one of the plurality of database processes be given access to the data in the plurality of the data tables is received via the database management system. A time segment for the database process for which access to the date in the plurality of data tables has been requested is determined via a computer processor. A database process/time segment pair for the database process for which access to the data in the plurality of data tables has been requested, the database process/time segment pair being determined by the time segment of the database processes for which access to data in the plurality of data tables has been requested, is determined via a computer processor. The one of the plurality of data tables with which the database process/time segment pair has been associated is determined via a computer processor, and access is allowed to the one of the plurality of data tables which was determined to be associated with the database process/time segment pair.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations that are within the scope of the appended claims and their equivalents.

Figure 1:
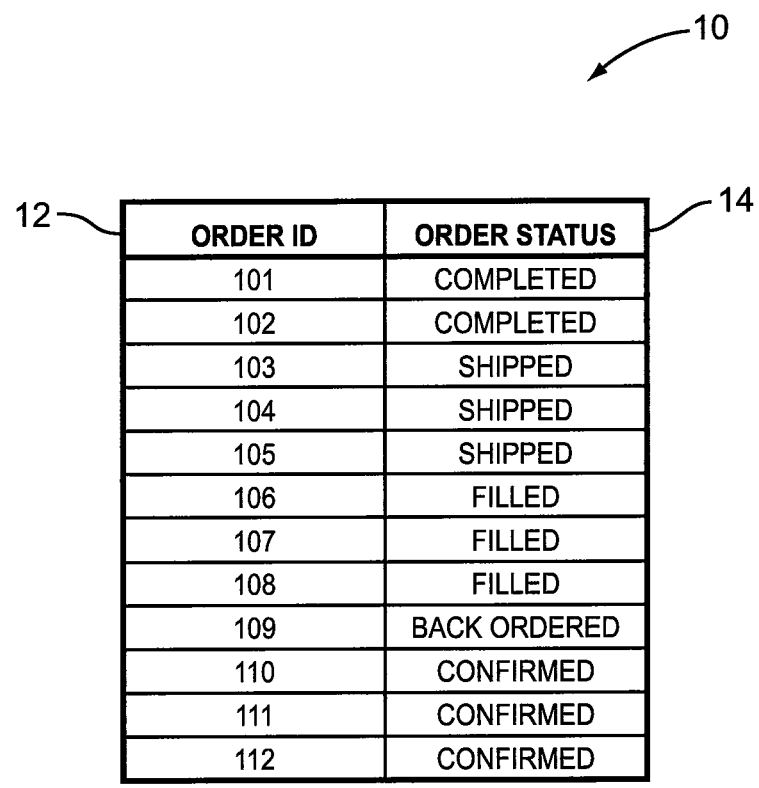
FIG. 1 depicts an exemplary transactional data table.

FIG. 1 is an exemplary transactional Data Table 10. As can be seen from FIG. 1, Data Table 10, has two data elements, i.e., columns or fields, namely, Order ID 12 and Order Status 14. The Order ID field 12 may be the index or primary key, which uniquely identifies each row of Data Table 10. The type of value for the Order ID field may be an integer value. The Order Status field 14 may have a character or string value type and contain a value selected from the following group: confirmed, back ordered, filled, shipped and completed. The Data Table 10 illustrated in FIG. 1 is exemplary and is not intended to and does not limit the scope of the present invention.

In an embodiment, the present invention can be implemented to control access to a single transactional data table, such as Data Table 10, shown in FIGS. 2A to 2F. FIGS. 2A to 2F depict an exemplary Data Table 10, illustrated at six (6) different time segments (Time Segments 0-5). Access to data in Data Table 10 by a database process is controlled using the time sharing method of the present invention and the Data Control Matrix 50 depicted in FIGS. 3A and 3B. In an embodiment, the Data Table 10 is a transactional data table containing dynamic data, i.e., the data table must allow simultaneous access by a large number of contentious database processes.

As can be seen in FIGS. 2A to 2F, the Data Table 10 illustrated includes the following data elements: Order ID 12, Order Status 14 and Data Group 16. As can also be seen from FIGS. 2A to 2F, the Data Table 10 has 6 (six) data groups: Data Group 1 20a, Data Group 2 20b, Data Group 3 20c, Data Group 4 20d, Data Group 5 20e and Data Group 6 20f. The invention, however, is not limited to any particular number of data groups and six (6) data groups are used for purposes of illustration only.

Figure 2A:
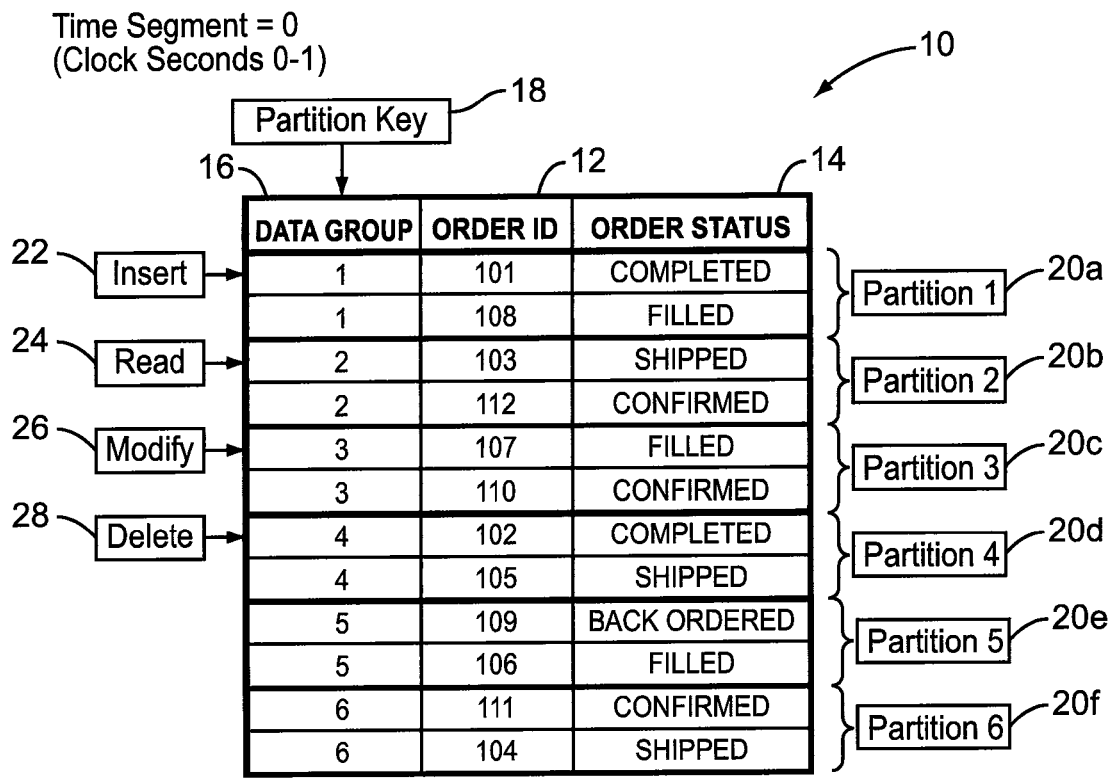
FIGS. 2A to 2F illustrate controlling access to an exemplary data table, at six different time segments, using the time sharing method of the present invention and the exemplary data control matrix depicted in FIGS. 3A and 3B.

Continuing to refer to FIG. 2A, Data Table 10 is illustrated at Time Segment 0. A process for determining the time segment of a database process using the runtime of the database process is discussed in more detail below. As shown in FIG. 2A, at Time Segment 0, each of a plurality of database processes, e.g., Insert 22, Read 24, Modify 26, Delete 28, is allowed access to one and only one of the Data Groups 20a-20f of Data Table 10. As can be appreciated, the specific database processes discussed herein and illustrated in the figures are exemplary and do not limit the scope of the invention. As can also be appreciated, the control of access of any type and number of database processes to a data table is within the scope of the present invention.

Figure 3A:
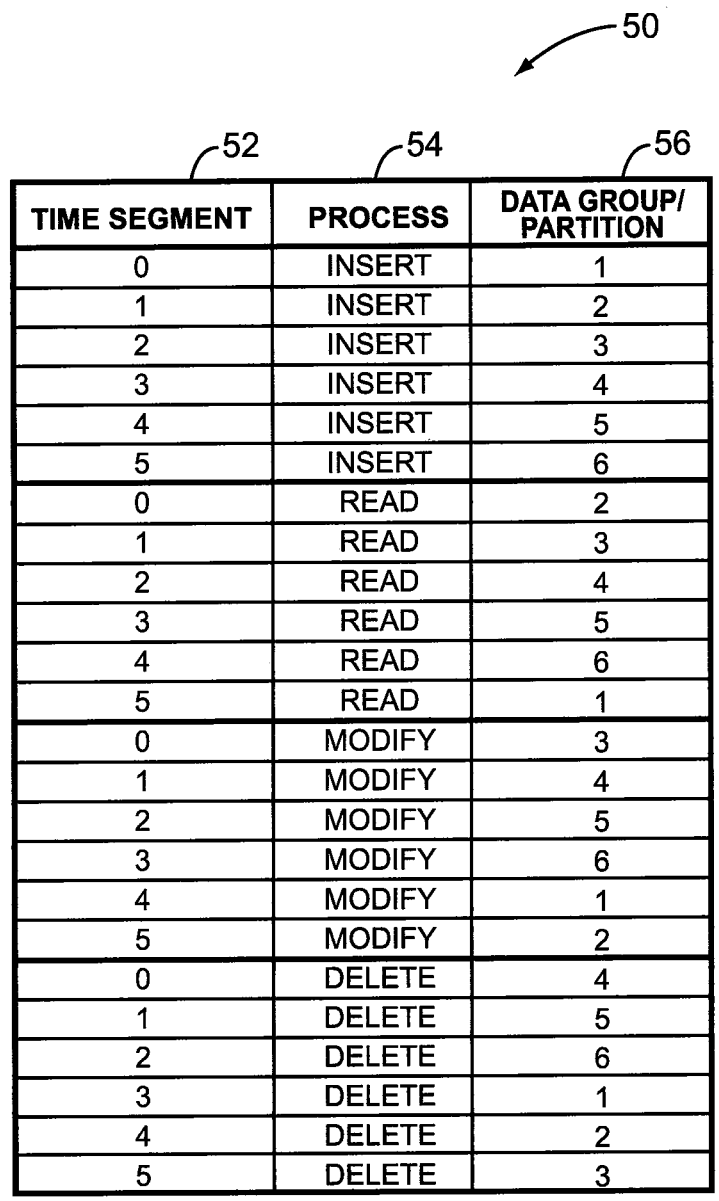
FIG. 3A depicts an exemplary data control matrix, sorted by time segment, used to control access to the data table shown in FIGS. 2A to 2F.
Figure 3B:
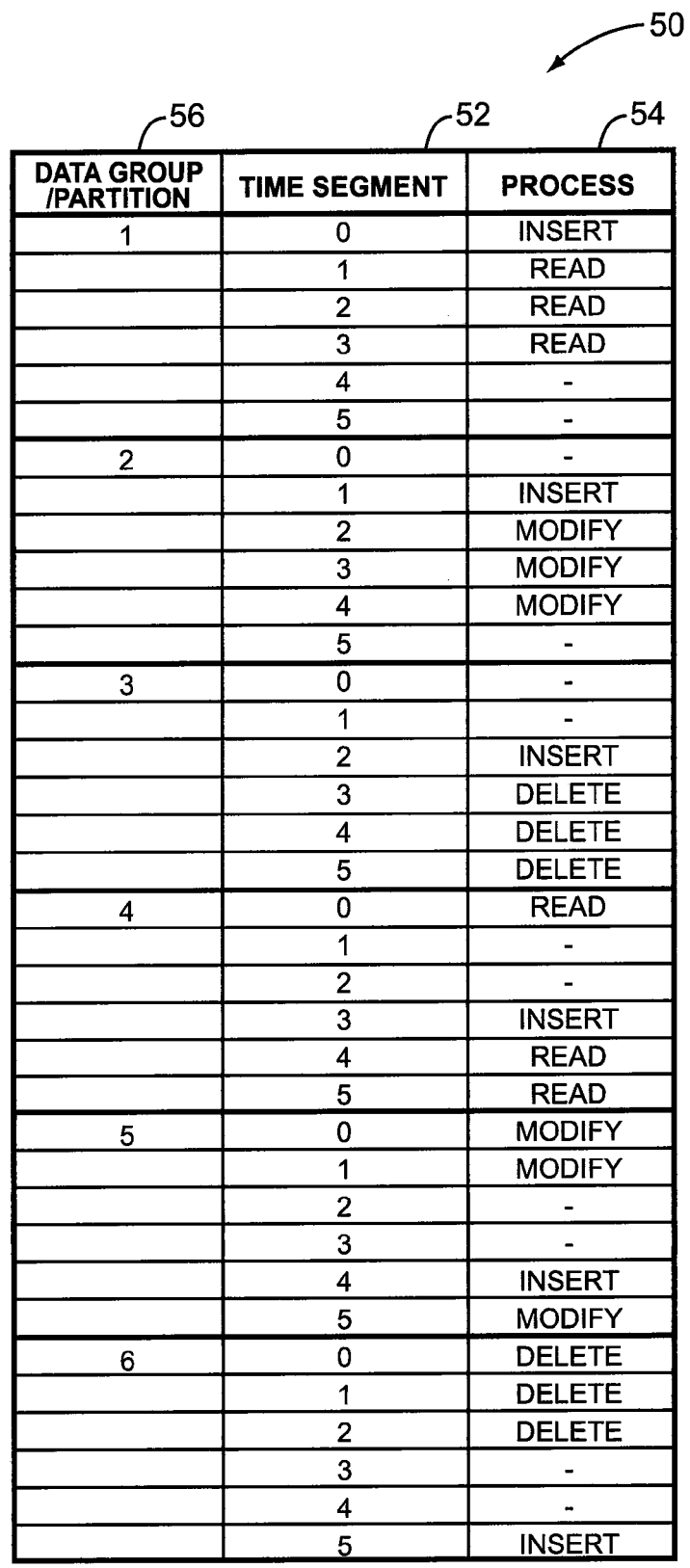
FIG. 3B depicts an exemplary data control matrix, sorted by data group or partition, used to control access to the data table, shown in FIGS. 2A to 2F.

The control of access to, and the association of a specific database process with, a specific data group or partition of Data Table 10 during a specific time segment may be defined by Data Control Matrix 50, which is illustrated in FIGS. 3A and 3B.

FIG. 3A is an exemplary Data Control Matrix 50, sorted by Time Segment, used to control access to Data Table 10, shown in FIGS. 2A to 2F. Each of four exemplary database processes (Insert, Read, Modify and Delete) are associated with one of six data groups based on the time segment of the database process. As can be seen from FIG. 3A, Data Control Matrix 50 is comprised of the following data elements: Time Segment identifier 52, Database Process identifier 54 and Data Group identifier 56.

According to Data Control Matrix 50, during Time Segment 0, for example, an Insert process inserts a row into Data Table 10 having a Data Group identifier value of 1. Similarly, during Time Segment 1, an inserted row into Data Table 10 would have a Data Group identifier value of 2.

As also can be seen from Data Control Matrix 50, during Time Segment 0, a Read process is given access to rows Data Group 2. Similarly, during Time Segment 0, a Modify process is given access to Data Group 3, and a Delete process is given access to Data Group 4. As also can be seen from FIG. 3A, only one database process is associated with, and therefore given access to, only one data group during any given time segment, thereby minimizing contention of the database processes accessing Data Table 10.

The time segment with which a database process is associated in Data Control Matrix 50 may be determined on the basis of a clock time. The clock time may be the clock time at runtime, i.e., the clock time of the execution of the database process. Thus, once the clock time of an insert process is determined, a time segment is determined on the basis of the clock time of the process. A method for determining a time segment for a process at runtime is discussed below. The invention, however, is not limited to using clock time and/or the clock time at runtime.

A time segment can be determined from a clock time using modular arithmetic. Modular arithmetic is an arithmetic calculation with integers that "wrap around" once they reach a certain value. An analog clock, for example, goes from 0-59 seconds and then, it repeats the cycle, and it goes from 0-59 seconds again. This is an arithmetic modulo 60.

Modulo is sometimes referred to as the remainder of the division of two integers. For example, 8 modulo 6=2. In other words, subtracting 6 from 8 (one time) leaves a reminder of 2. This equivalent to 6+2=8.

Modular arithmetic can be extended to have the notion of "congruence." Mathematically, two numbers a and b are "congruent modulo n," if they have the same remainder, when they are divided by a multiplier, n. As an example, the numbers 8 and 14 are congruent (modulo 6), because if they are divided by 6, they both have a remainder of 2. Notationally, this can be expressed as: 8≡14 (mod 6).

A time segment ("TS"), therefore, can be determined by using clock time in seconds or clock seconds. A clock time can be determined, for example, by executing a native database management system function (e.g., an SQL function) that returns the current value of the time segment's fundamental unit, e.g., a clock second. As such, the determination of time segment adds no overhead and requires no additional control or synchronization mechanism, and is done within the context of the database process itself. Therefore, the determination of time segment/partition ID happens as part of the query accessing the data table. Alternatively, the clock time can be determined in a separate query executed just prior to the data access query.

An exemplary method for determining a time segment (TS) value based on clock seconds (CS) for a predefined time interval (TI) (or clock cycle) can be expressed as follows:

TS=n modulo (TI÷D),
where TS is an integer,
TI is an integer that is a predefined time interval in seconds,
D is an integer that is a predefined duration in seconds for each segment of time interval TI, and
n is an integer that is defined as the multiplier of CS modulo 2, where CS is an integer that is clock time in seconds, i.e., clock seconds.

Thus, for example, if a time interval TI is defined to be twelve (12) seconds (TI=12), the duration D of each segment of time interval TI is defined to be 2 seconds (D=2), values for time segment TS based on clock seconds CS can be determined using the method set forth above. Table 1 below sets forth the calculations for deterring the values of time segment TS for clock seconds CS 0-29:

TABLE 1

| Clock Seconds CS | CS mod D | N | N mod TI = Time Segment |
|---|---|---|---|
| 0 | 0 | 0 | 0 |
| 1 | 1 | 0 | 0 |
| 2 | 0 | 1 | 1 |
| 3 | 1 | 1 | 1 |
| 4 | 0 | 2 | 2 |
| 5 | 1 | 2 | 2 |
| 6 | 0 | 3 | 3 |
| 7 | 1 | 3 | 3 |
| 8 | 0 | 4 | 4 |
| 9 | 1 | 4 | 4 |
| 10 | 0 | 5 | 5 |
| 11 | 1 | 5 | 5 |
| 12 | 0 | 6 | 0 |
| 13 | 1 | 6 | 0 |
| 14 | 0 | 7 | 1 |
| 15 | 1 | 7 | 1 |
| 16 | 0 | 8 | 2 |
| 17 | 1 | 8 | 2 |
| 18 | 0 | 9 | 3 |

TABLE 1-continued

| Clock Seconds CS | CS mod D | N | N mod TI = Time Segment |
|---|---|---|---|
| 19 | 1 | 9 | 3 |
| 20 | 0 | 10 | 4 |
| 21 | 1 | 10 | 4 |
| 22 | 0 | 11 | 5 |
| 23 | 1 | 11 | 5 |
| 24 | 0 | 12 | 0 |
| 25 | 1 | 12 | 0 |
| 26 | 0 | 13 | 1 |
| 27 | 1 | 13 | 1 |
| 28 | 0 | 14 | 2 |
| 29 | 1 | 14 | 2 |

As can be appreciated, a twelve (12) second time interval TI (or clock cycle), with a two (2) second duration D for each segment of time interval TI, will repeat itself five (5) times during a sixty (60) second clock cycle. In an embodiment, the time interval TI and/or the duration D can be evenly divided, i.e., with a remainder of zero (0), into a sixty (60) second clock cycle. As can also be appreciated, the invention is not limited to any particular time measure, time interval or segment duration, and the use of any time measure, time interval or segment duration is within the scope of the invention.

Returning to FIG. 2A, the data group of Data Table 10 to which an Insert process 22 is given access to at Time Segment 0 is illustrated. Time Segment 0 may be defined as the time interval of clock seconds 0-1, i.e., any time during the interval of 0 to 1 seconds of any minute of any hour. As can be seen in FIG. 2A, at Time Segment 0, an Insert process 22 is given access to Data Group 1 20a. Thus, if a database management system is requested to insert a row into the Data Table 10, the system determines the clock time that the Insert process 22 executes. The clock time of the insert process may be, for example, the time the insert process is executed by the database management system, i.e., runtime.

Continuing with FIG. 2A, at Time Segment 0, the Insert process 22 is associated via Data Control Matrix 50 with a specific data group of the data table, namely, Data Group 1 20a. Thus, an Insert process 22 executed at Time Segment 0 is given access to Data Group 1 20a. Notably, no other database process, e.g., a Read process 24, a Modify process 26 or Delete process 28, is given access to Data Group 1 at Time Segment 0, thereby avoiding contention of these database processes.

Continuing with FIG. 2A, at Time Segment 0, a Read process 24 is associated with and given access to Data Group 2 20b, a Modify process 26 is associated with and given access to Data Group 3 20c, and a Delete process 28 is associated with and give access to Data Group 4 20d. Thus, during Time Segment 0, an insert process, a read request, a modify request and a delete request all can be processed simultaneously without any contention between and among the processes because each process has been assigned and given access to its own data group.

Figure 2B:
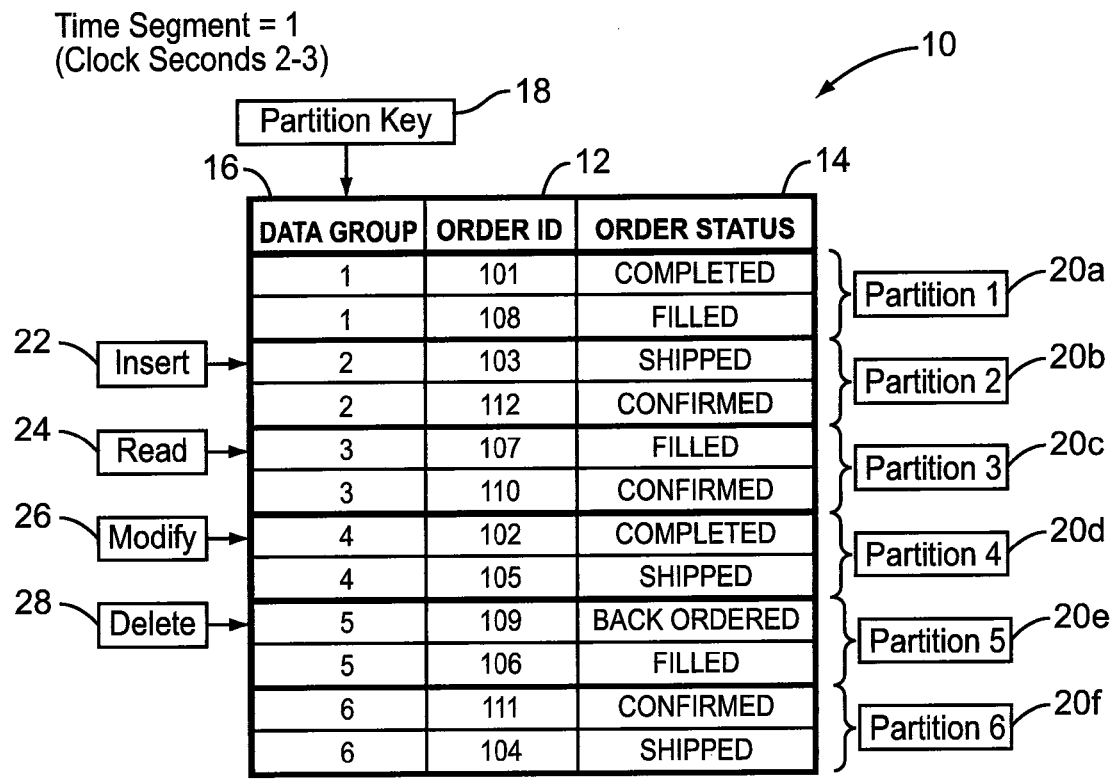

FIGS. 2B, 3A and 3B illustrate how various database processes are given access to various data groups at Time Segment 1. Time Segment 1 may be defined as the time interval consisting of clock seconds 2-3. As can be seen from FIGS. 2B and 3, at Time Segment 1, an Insert process 22 is given access to Data Group 2 20b, a Read process 24 is given access to Data Group 3 20c, a Modify process 26 is given access to Data Group 4 20d, and a Delete process 28 is given access to Data Group 4 20e. Thus, during Time Segment 1, an Insert process 22, a Read process 24, a Modify process 26 and a Delete process 28 can be processed simultaneously without any contention between and among the processes because each process has been assigned and given access to its own data group.

Figure 2C:
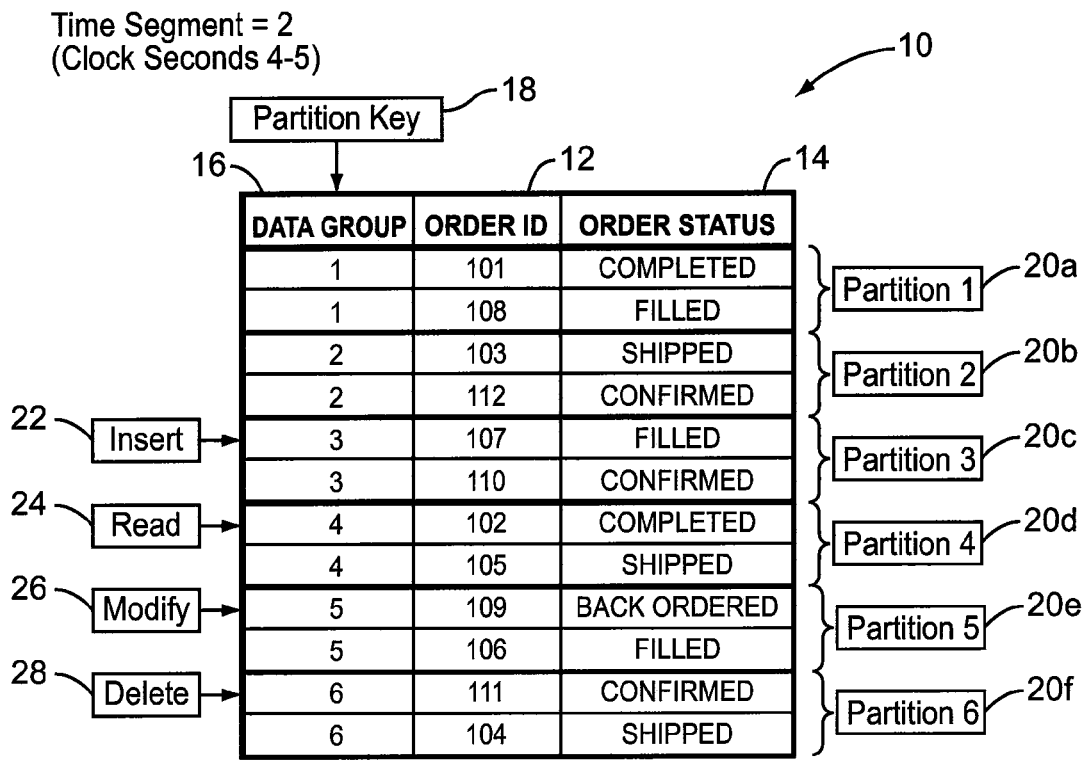

FIGS. 2C, 3A and 3B illustrate how various database processes are given access to various data groups at Time Segment 2. Time Segment 2 may be defined as the time interval consisting of clock seconds 4-5. As can be seen from FIGS. 2C and 3, at Time Segment 2, an Insert process 22 is given access to Data Group 3 20c, a Read process 24 is given access to Data Group 4 20d, a Modify process 26 is given access to Data Group 5 20e, and a Delete process 28 is given access to Data Group 6 20f. Thus, during Time Segment 2, an Insert process 22, a Read process 24, a Modify process 26 and a Delete process 28 can be processed simultaneously without any contention between and among the processes because each process has been assigned and given access to its own data group.

Figure 2D:
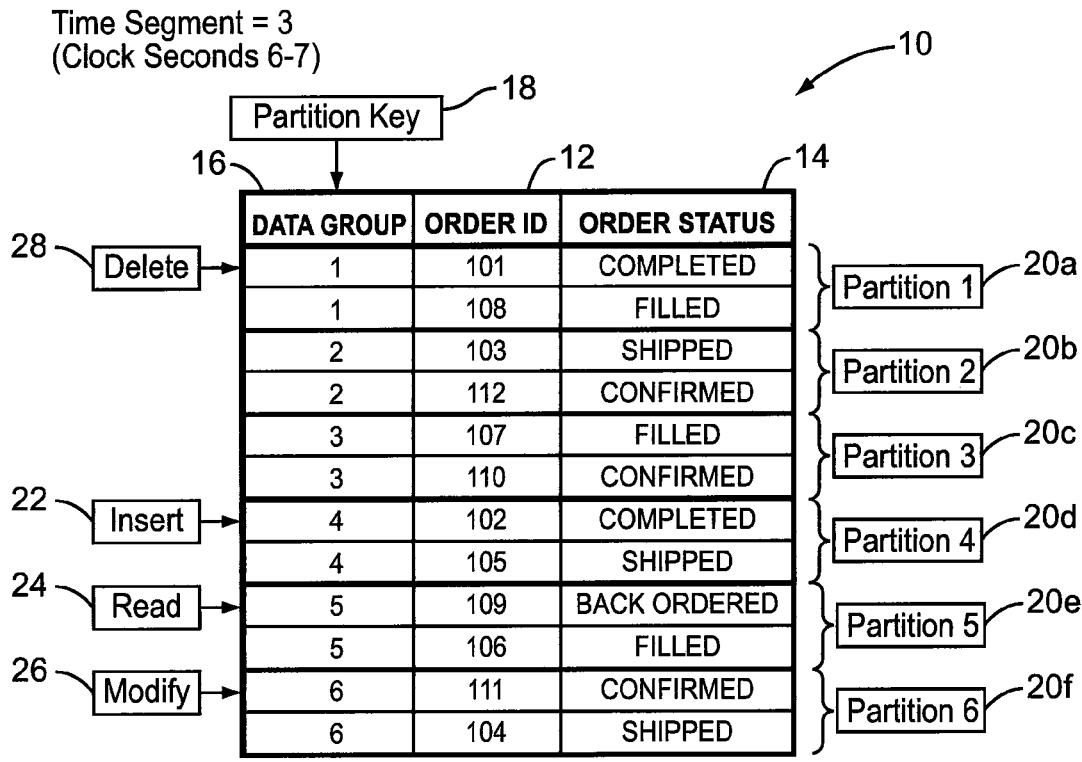

FIGS. 2D, 3A and 3B illustrate how various database processes are given access to various data groups at Time Segment 3. Time Segment 3 may be defined as the time interval consisting of clock seconds 6-7. As can be seen from FIGS. 2D and 3, at Time Segment 3, an Insert process 22 is given access to Data Group 4 20d, a Read process 24 is given access to Data Group 5 20e, a Modify process 26 is given access to Data Group 6 20f, and a Delete process 28 is given access to Data Group 1 20a. Thus, during Time Segment 3, an Insert process 22, a Read process 24, a Modify process 26 and a Delete process 28 can be processed simultaneously without any contention between and among the processes because each process has been assigned and given access to its own data group.

Figure 2E:
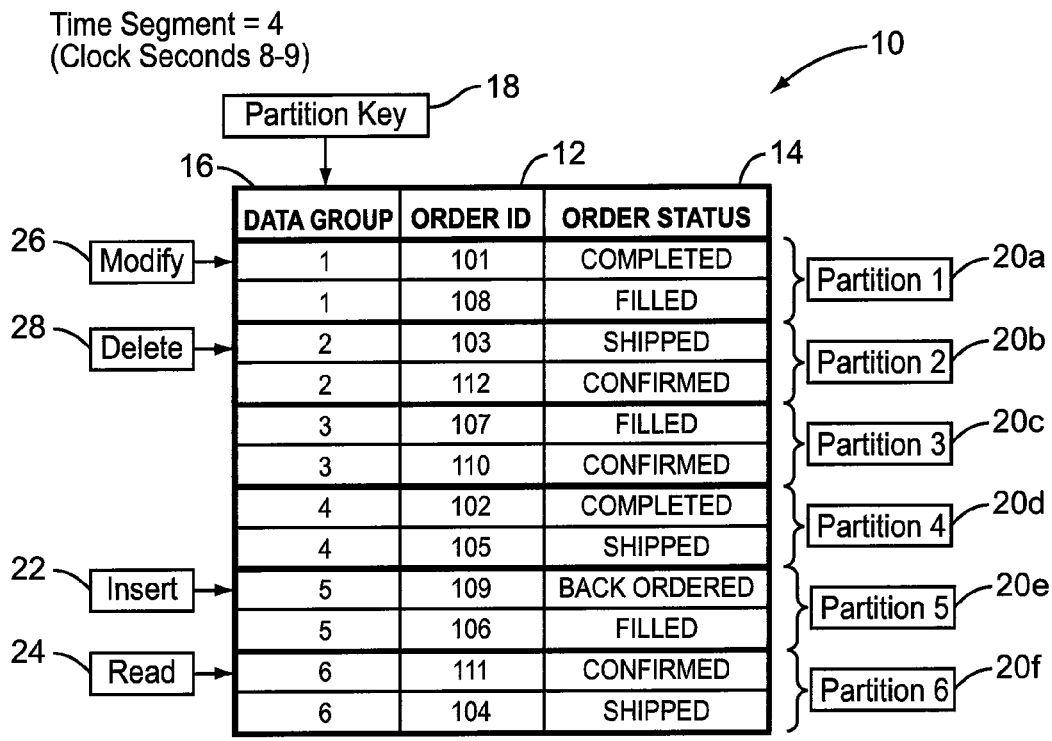

FIGS. 2E, 3A and 3B illustrate how various database processes are given access to various data groups at Time Segment 4. Time Segment 4 may be defined as the time interval consisting of clock seconds 8-9. As can be seen from FIGS. 2E and 3, at Time Segment 4, an Insert process 22 is given access to Data Group 5 20e, a Read process 24 is given access to Data Group 6 20f, a Modify process 26 is given access to Data Group 1 20a, and a Delete process 28 is given access to Data Group 2 20b. Thus, during Time Segment 4, an Insert process 22, a Read process 24, a Modify process 26 and a Delete process 28 can be processed simultaneously without any contention between and among the processes because each process has been assigned and given access to its own data group.

Figure 2F:
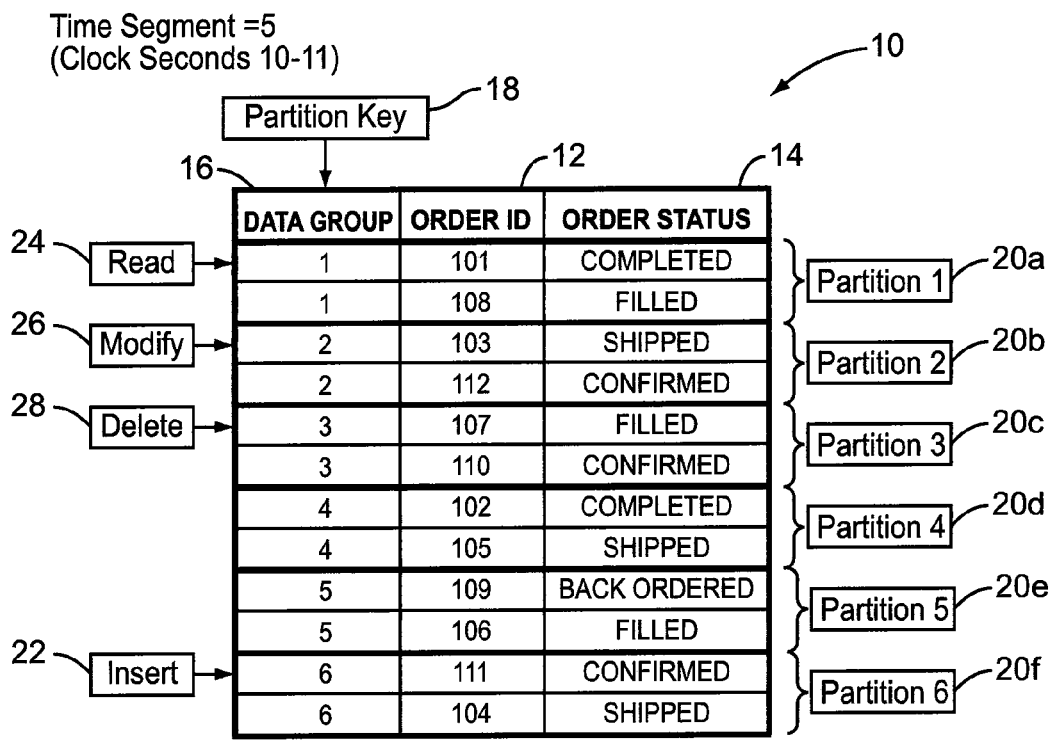

FIGS. 2F, 3A and 3B illustrate how various database processes are given access to various data groups at Time Segment 5. Time Segment 5 may be defined as the time interval consisting of clock seconds 10-11. As can be seen from FIGS. 2F and 3, at Time Segment 5, an Insert process 22 is given access to Data Group 6 20f, a Read process 24 is given access to Data Group 1 20a, a Modify process 26 is given access to Data Group 2 20b, and a Delete process 28 is given access to Data Group 3 20c. Thus, during Time Segment 5, an Insert process 22, a Read process 24, a Modify process 26 and a Delete process 28 can be processed simultaneously without any contention between and among the processes because each process has been assigned and given access to its own data group.

As can be appreciated, because six (6) data groups are used in the example described in FIGS. 2A to 2F, the next time segment, Time Segment 6, which would be defined as the time interval consisting of clock seconds 12-13, would allow database processes access to Data Table 10 the same way database processes are given access to Data Table 10 at Time Segment 0.

In an embodiment, the data in Data Table 10 may be partitioned based on the time segment that a database process accesses the data in Data Table 10. The time segment of a database process can be determined by the method discussed in detail above. As illustrated in FIGS. 2A to 2F, Data Table 10 can be partitioned by defining the Partition Key 18 to be the Data Group identifier 16. Thus, the Data Table 10 would have six (6) partitions, 20a-to 20f. The partitioning of Data Table 10 further minimizes contention of the database processes accessing Data Table 10. As can be appreciated, partitioning Data Table 10 allows the database management system to treat each partition of Data Table 10 as a separate data table. Thus, each partition can be stored in its own allocated disk area. When the database management system locks the data in Data Table 10 to allow a database process access to the data in the table, the database management system locks only the partition in which the data being accessed is stored.

As can be appreciated, Data Control Matrix 50 illustrated in FIG. 3A is sorted by Time Segment and then Database Process. As can also be appreciated, Data Control Matrix 50 can be sorted, for example, by Data Group or Partition. FIG. 3B illustrates Data Control Matrix 50 sorted by Data Group or Partition and by then by Time Segment.

In another embodiment, the system and method of the present invention can be used to control access of database processes to a plurality of data tables. FIGS. 4A to 4F depict an exemplary plurality of six (6) Data Tables 100a-100f, illustrated at six different time segments (Time Segments 0-5). Access to Data Tables 100a-100f can be controlled using the time sharing method of the present invention and the Data Control Matrix 500 depicted in FIGS. 5A and 5B. In an embodiment, Data Tables 100a to 100f are for staging data that is later stored persistently in one or more other data tables. In an embodiment, the Data Tables 100a-100f are transactional data tables containing dynamic data, i.e., the data tables must allow simultaneous access by a large number of contentious database processes. The invention, however, is not limited to controlling access to any particular number of data tables and six (6) data tables are used for purposes of illustration only.

As can be appreciated, the Data Tables 100a-100f may include the same exemplary data elements contained in Data Table 10, which is illustrated in FIGS. 2A-2F. For example, each of the Data Tables 100a-100f may include the following data elements (not shown): Order ID, Order Status and Data Group.

Figure 4A:
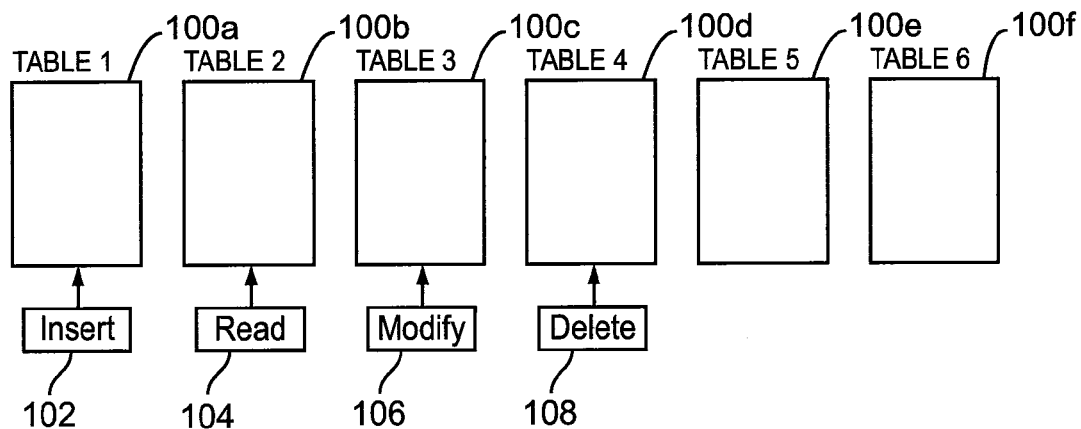
FIGS. 4A to 4F illustrate controlling access to an exemplary plurality of six (6) data tables, at six (6) different time segments, using the time sharing method of the present invention and the data control matrix depicted in FIGS. 5A and 5B.

Continuing to refer to FIG. 4A, Data Tables 100a-100f are illustrated at Time Segment 0. A process for determining the time segment of a database process is discussed in detail above. As shown in FIG. 4A, at Time Segment 0, each of a plurality of database processes, e.g., Insert 102, Read 104, Modify 106, Delete 108, is given access to one and only one of the Data Tables 100a-100f. Again, the specific database processes discussed herein and illustrated in the figures are exemplary and do not limit the scope of the invention. As can be appreciated, the present invention may be used to control access of any type and number of database processes to a plurality of data tables.

Figure 4B:
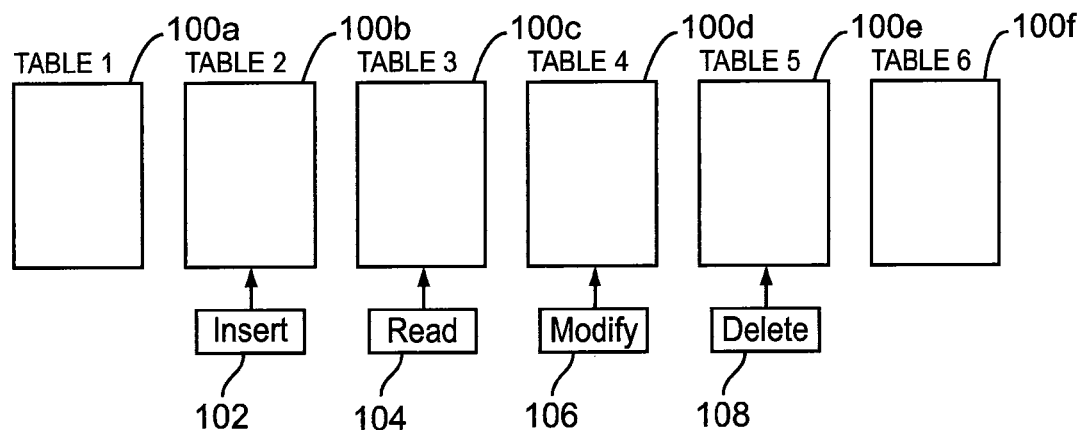
Figure 4C:
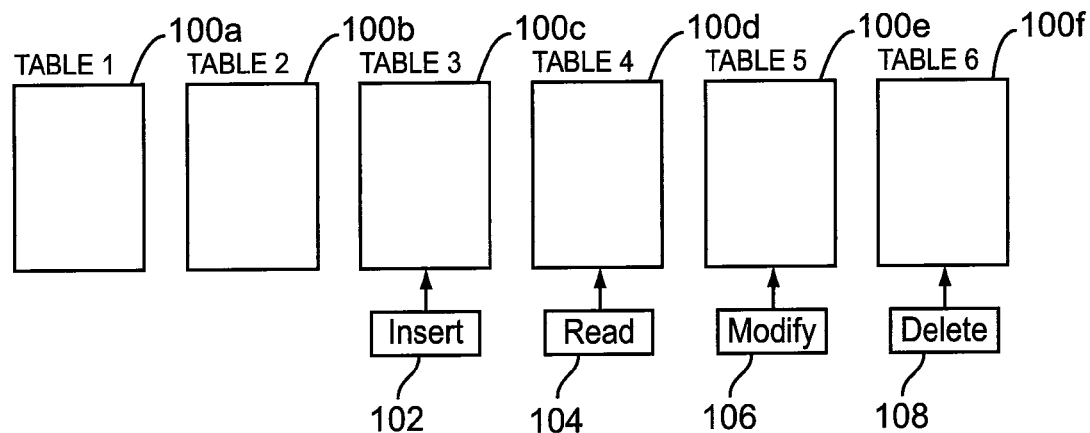
Figure 4D:
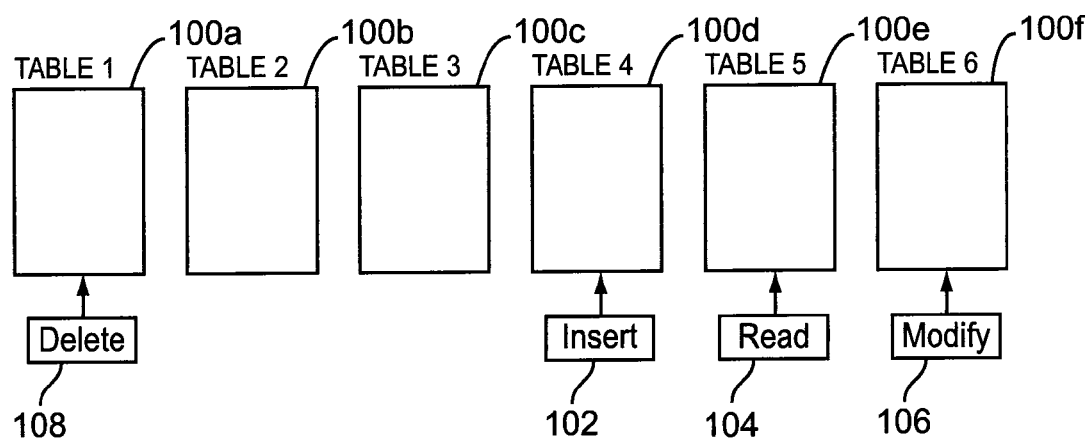
Figure 4E:
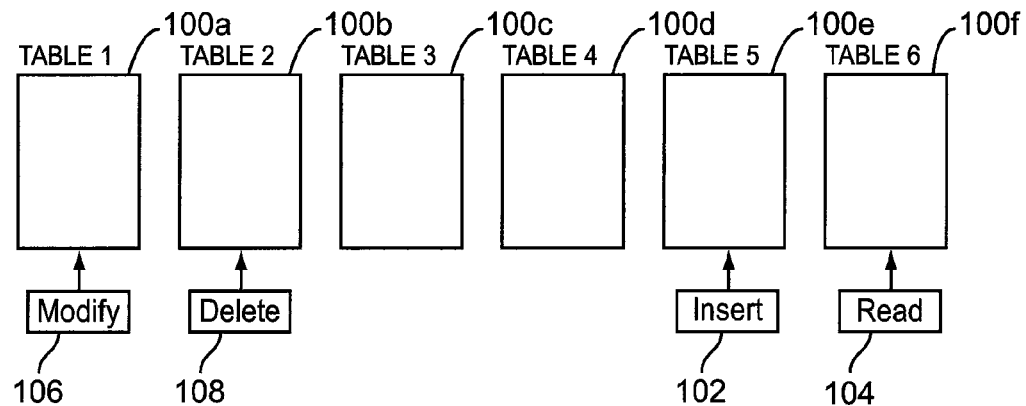
Figure 4F:
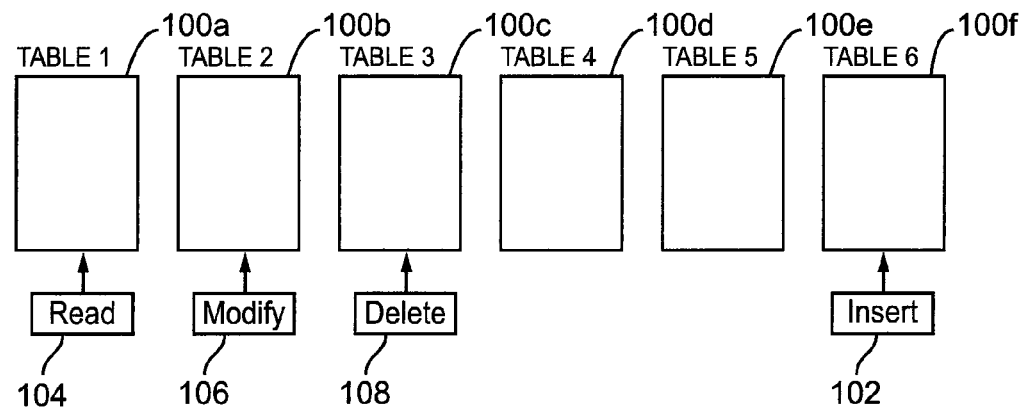
Figure 5A:
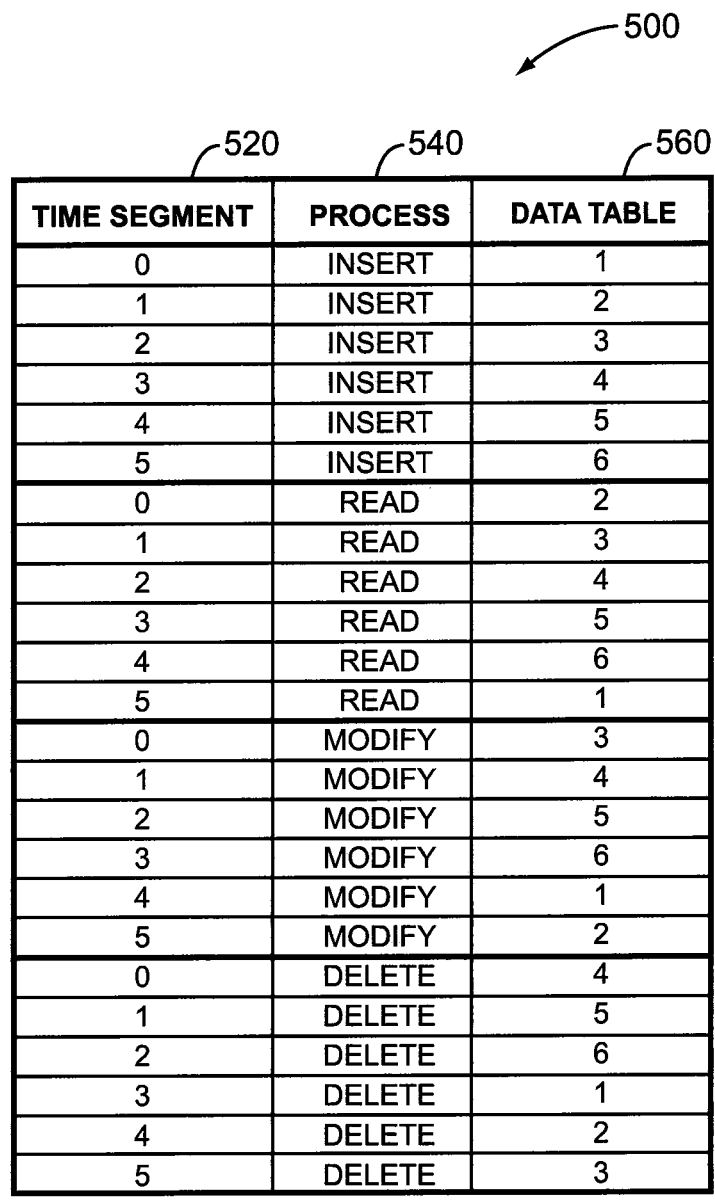
FIG. 5A is an exemplary data control matrix, sorted by time segment, used to control access to the plurality of the data tables shown in FIGS. 4A to 4F.
Figure 5B:
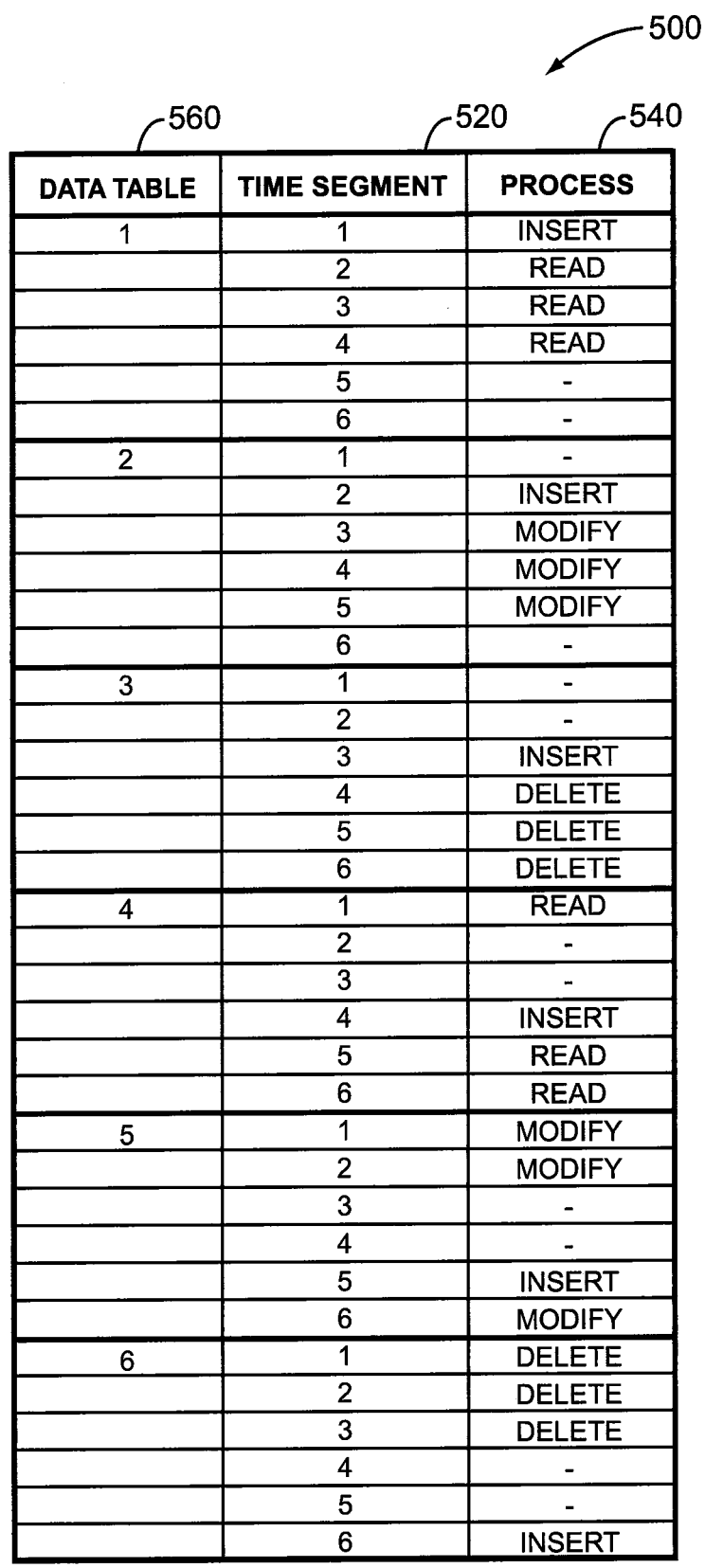
FIG. 5B depicts an exemplary data control matrix, sorted by data table, used to control access to the plurality of the data tables, shown in FIGS. 4A to 4F.

As mentioned above, the access of a specific database process to a plurality of data tables, such as the Data Tables 100a-f illustrated in FIG. 4A to 4F, may be controlled by defining a Data Control Matrix 500, which is illustrated in FIGS. 5A and 5B. Turning to FIG. 5A, an exemplary Data Control Matrix 500 is illustrated, which is sorted by Time Segment and used to control access by any given database process to one of a plurality of data tables at any given time segment. Again, access of each of four exemplary database processes (Insert, Read, Modify and Delete) to one of Data Tables 100a-100f is controlled by using the runtime of the database process. As can be seen from FIG. 5A, Data Control Matrix 500 may be comprised of the following data elements: Time Segment identifier 520, Database Process identifier 540 and Data Table identifier 560. According to Data Control Matrix 500, during Time Segment 0, for example, an Insert process inserts a row into Data Table 1, and the inserted row includes a Data Table identifier value of 1. Similarly, during Time Segment 1, an inserted row would be inserted into Data Table 2, and would have a Data Table identifier value of 2. As also can be seen from Data Control Matrix 500, during Time Segment 0, a Read process is directed to read rows in Data Table 2. Similarly, during Time Segment 0, a Modify process is directed to modify rows in Data Table 3, and a Delete process is directed to delete rows in Data Table 4. As also can be seen from FIG. 5A, only one database process is associated with only one data table during any given time segment, thereby minimizing contention of the database processes executing on Data Tables 100a-100f.

The time segment with which a database process is associated in Data Control Matrix 500 may be determined on the basis of a clock time, which is explained in detail above.

Returning to FIG. 4A, the data table to which an Insert process 102 is given access in order to insert a row of data at Time Segment 0 is illustrated. Time Segment 0 may be defined as the time interval of clock seconds 0-1, i.e., any time during the interval of 0 to 1 seconds of any minute of any hour. As can be seen in FIG. 4A, at Time Segment 0, an Insert process 102 is given access to Data Table 1 100a. Thus, if a database management system is requested to insert a row, the system determines the clock time that Insert process 22 executes. The clock time of the insert process may be, for example, the time the insert process is executed by the database management system, i.e., runtime.

Continuing with FIG. 4A, at Time Segment 0, the Insert process 102 is associated via a data table matrix with a specific data table, namely, Data Table 1 100a of FIG. 4A. Thus, an Insert process 22 received at Time Segment 0 is given access to Data Table 1 100a. Notably, no other database process, e.g., a Read process 104, a Modify process 106 or Delete process 108, is given access to Data Table 1 at Time Segment 0, thereby avoiding contention of these database processes.

Continuing with FIG. 4A, at Time Segment 0, a Read process 104 is associated with, and given access to, Data Table 2 100b, a Modify process 106 is associated with, and given access to, Data Table 3 100c, and a Delete process 108 is associated with, and given access to, Data Table 4 100d. Thus, during Time Segment 0, an insert process, a read request, a modify request and a delete request all can be processed simultaneously without any contention between and among the processes because each process has been assigned and given access to its own data table at Time Segment 0.

FIGS. 4B and 5A illustrate how various database processes are given access to various data tables at Time Segment 1. Time Segment 1 may be defined as the time interval consisting of clock seconds 2-3. As can be seen from FIGS. 4B and 5A, at Time Segment 1, an Insert process 102 is given access to Data Table 2 100b, a Read process 104 is given access to Data Table 3 100c, a Modify process 106 is given access to Data Table 4 100d, and a Delete process 108 is given access to Data Table 5 100e. Thus, during Time Segment 1, an Insert process 102, a Read process 104, a Modify process 106 and a Delete process 108 can be processed simultaneously without any contention between and among the processes because each process has been assigned and given access to its own data table at Time Segment 1.

FIGS. 4C and 5A illustrate how various database processes are given access to various data tables at Time Segment 2. Time Segment 2 may be defined as the time interval consisting of clock seconds 4-5. As can be seen from FIGS. 4C and 5A, at Time Segment 2, an Insert process 102 is given access to Data Table 3 100c, a Read process 104 is given access to Data Table 4 100d, a Modify process 106 is given access to Data Table 5 100e, and a Delete process 108 is given access to Data Table 6 100f. Thus, during Time Segment 2, an Insert process 102, a Read process 104, a Modify process 106 and a Delete process 108 can be processed simultaneously without any contention between and among the processes because each process has been assigned and given access to its own data table at Time Segment 2.

FIGS. 4D and 5A illustrate how various database processes are given access to various data tables at Time Segment 3. Time Segment 3 may be defined as the time interval consisting of clock seconds 6-7. As can be seen from FIGS. 4D and 5A, at Time Segment 3, an Insert process 102 is given access to Data Table 4 100d, a Read process 104 is given access to Data Table 5 100e, a Modify process 106 is given access to Data Table 6 100f, and a Delete process 108 is given access to Data Table 1 100a. Thus, during Time Segment 3, an Insert process 102, a Read process 104, a Modify process 106 and a Delete process 108 can be processed simultaneously without any contention between and among the processes because each process has been assigned and given access to its own data table at Time Segment 3.

FIGS. 4E and 5A illustrate how various database processes are given access to various data tables at Time Segment 4. Time Segment 4 may be defined as the time interval consisting of clock seconds 8-9. As can be seen from FIGS. 4E and 5A, at Time Segment 4, an Insert process 102 is given access to Data Table 5 100e, a Read process 104 is given access to Data Table 6 100f, a Modify process 106 is given access to Data Table 1 100a, and a Delete process 108 is given access to Data Table 2 100b. Thus, during Time Segment 4, an Insert process 102, a Read process 104, a Modify process 106 and a Delete process 108 can be processed simultaneously without any contention between and among the processes because each process has been assigned and given access to its own data table at Time Segment 4.

FIGS. 4F and 5A illustrate how various database processes are given access to various data tables at Time Segment 5. Time Segment 5 may be defined as the time interval consisting of clock seconds 10-11. As can be seen from FIGS. 4F and 5A, at Time Segment 5, an Insert process 102 is given access to Data Table 6 100f, a Read process 104 is given access to Data Table 1 100a, a Modify process 106 is given access to Data Table 2 100b, and a Delete process 108 is given access to Data Table 3 100c. Thus, during Time Segment 5, an Insert process 102, a Read process 104, a Modify process 106 and a Delete process 108 can be processed simultaneously without any contention between and among the processes because each process has been assigned and given access to its own data table at Time Segment 5.

As can be appreciated, because six (6) data tables are used in the example described in FIGS. 4A to 4F, the next time segment, Time Segment 6, which would be defined as the time interval consisting of clock seconds 12-13, would allow database processes access to Data Table 100a the same way database processes are given access to Data Table 100a at Time Segment 0.

As can be appreciated, each of the Data Tables 100a-100f in FIGS. 4A to 4F can have data grouped or partitioned within the table, as described above. The Data Tables 100a-100f can be partitioned by defining the partition key (not shown) to be the data group identifier (not shown). Thus, each of Data Tables 100a-100f would have six (6) partitions.

As can be appreciated, Data Table Matrix 500 illustrated in FIG. 4A is sorted by Time Segment and then Database Process. As can be appreciated, Data Control Matrix 500 also can be sorted, for example, by Data Table. FIG. 5B illustrates Data Table Matrix 500 sorted by Data Table and by then by Time Segment.

Figure 6:
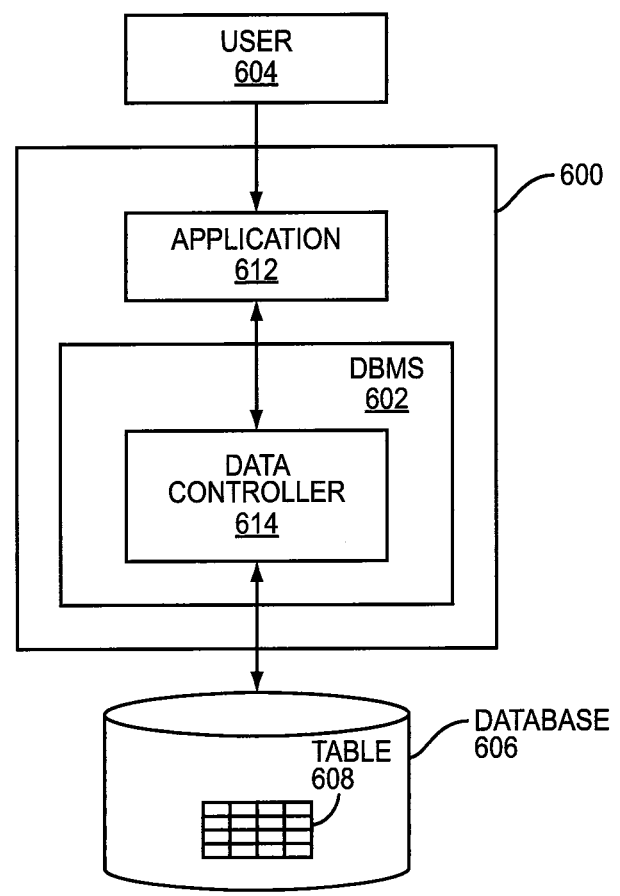
FIG. 6 is a diagram illustrating an exemplary database management system in connection with which the present invention may be used.

In operation, the system and method of the present invention operates in connection with a database management system, as shown in FIG. 6. As can be seen from FIG. 6, system 600 includes a general purpose computer on which a database management system 602 executes to provide a user 604 with access to a database 606. In an embodiment, the database 606 is a relational database whose contents are organized by relations that are represented as tables of data values, such as the table 608. A user 604 may request access to database 606 via an application program 612 that is coupled to the database management system 602. User may access the application program 612 via a web service (not shown). Database access requests are received by database management system 602, which identifies the stored data in table 608 needed to satisfy the request. The database access requests received by database management system 602 are processed via a data controller 614. Data controller 614 is configured to control access to data table 606 according to the systems and methods of the present invention, as described in detail above.

The methods for controlling access to one or more data tables may be performed by a general purpose computer running a commercially available database management system, such as the SQL Server 2008 database management system running on a Windows operating system, both of which are available from Microsoft Corporation of Redmond, Wash. Application programs accessing one or more data tables, access to which is controlled by the system and method of the prevent invention, may include one or more embedded SQL statements implementing an embodiment of the present invention.

Figure 7:
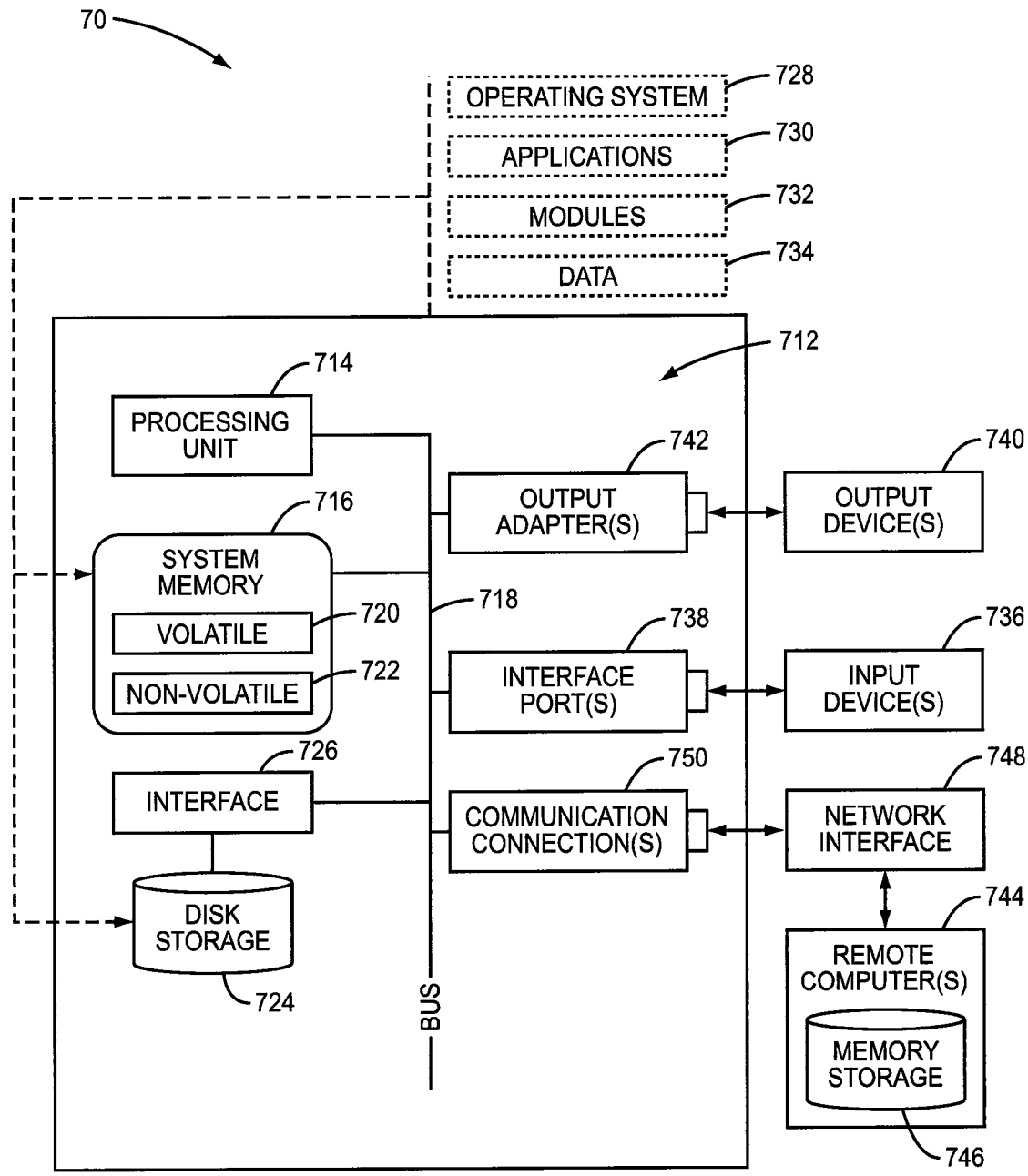
FIG. 7 is a diagram illustrating exemplary computer hardware and software to implement an embodiment of the invention.

FIG. 7 illustrates exemplary hardware and software components that may be used to implement an embodiment of the present invention. While aspects of the invention may be described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 70 is an exemplary suitable operating environment and does not limit the scope of the invention. Other known computer systems, environments, and/or configurations may be suitable for use with the invention.

Referring to FIG. 7, an exemplary environment 70 for implementing various aspects of the invention includes a computer 712, which includes a processing unit 714, a system memory 716, and a system bus 718. The system bus 718 couples the system components including, the system memory 716 to the processing unit 714. The processing unit 714 can be any of various processors available. The system bus 718 can be any of the available types of bus structures using any variety of available bus architectures. The system memory 716 includes volatile memory 720 and nonvolatile memory 722.

Computer 712 also may include removable/nonremovable, volatile/nonvolatile computer storage media, for example, a disk storage 724. Disk storage devices 724 may be connected to the system bus 718 via removable or non-removable interface 726.

FIG. 7 also illustrates software that allows interaction between users and computer resources, which may include an operating system 728. System applications 730 are allocated resources by operating system 728 through program modules 732 and program data 734 stored either in system memory 716 or on disk storage 724. Aspects of the present invention may be implemented with various operating systems or combinations of operating systems.

A user enters commands or information into computer 712 through input devices 736, which connect to processing unit 714 through the system bus 718 via interface ports 738. Input devices may include scanners, optical, radio frequency identification, etc., which can be used to identify returned items so that they can be further processed. Output devices 740 use some of the same type of ports as input devices 736. Output adapter 742 may be provided because some output devices 740 like monitors, speakers and printers require special adapters. Other devices and/or systems of devices provide both input and output capabilities such as remote computers 744.

Computer 712 can operate in a networked environment using logical connections to one or more remote computers, such as remote computers 744. The remote computers 744 can be a personal computer, a server, a router, a network PC, a workstation, a microprocessor based appliance, a peer device or other common network node, which may include many or all of the elements of computer 712. While only a single memory storage device 746 is shown, remote computers 744 may be logically connected to computer 712 through a network interface 748 and physically connected via communication connection 750.

Figure 8:
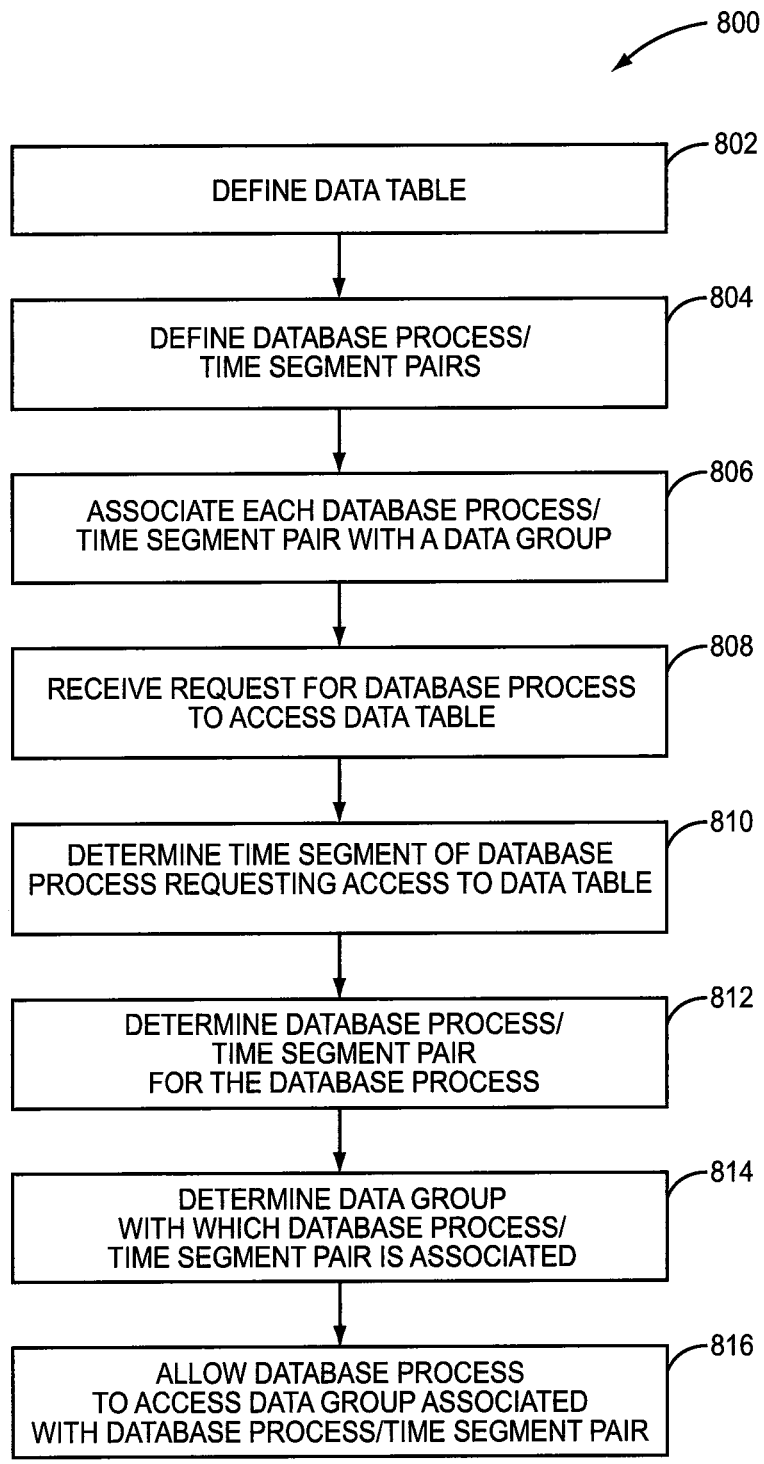
FIG. 8 is a flow chart illustrating an embodiment of the time sharing access control method of the present invention.

FIG. 8 is a flow chart illustrating an embodiment of the time sharing access control method 800 of the present invention. As can be appreciated, each of the steps illustrated in FIG. 8 can be executed by a computer processor comprised of computer hardware and computer software.

As can be seen from FIG. 8, in block 802, the processor defines a data table via a database management system and the defined data table is stored in a computer memory. A exemplary data table is discussed above in connection with FIGS. 2A to 2F. Processing control is then transferred to block 804.

In block 804, the processor defines a plurality of database process/time segment pairs and the defined pairs are stored in a computer memory. Each of the pairs is defined by pairing each of a plurality of database process with each of a plurality of time segments. Exemplary database process/time segment pairs are illustrated in FIGS. 3A and 3B. Processing control is then transferred to block 806.

In block 806, the processor associates each of the database process/time segment pairs defined in block 804 with each of a plurality of data groups and the associations are stored in a computer memory. FIGS. 3A and 3B illustrate an exemplary association of a plurality of database process/time segment pairs with each of a plurality of data groups. As can be appreciated, and as discussed above, the data table can be partitioned and each of the database process/time segment pairs alternatively can be associated with one of the partitions of the data table. Processing control is then transferred to block 808.

In block 808, the processor receives a request for a particular database process to access data in the data table. Exemplary database processes are discussed in detail above. Processing control is then transferred to block 810.

In block 810, the processor determines the time segment of the database process that requested access to the data in the data table in block 808. An exemplary method for determining a time segment of a database process is discussed in detail above. As discussed above, the time segment of the database process may be determined by the runtime of the database process, and the runtime can be determined by determining the clock seconds of the runtime of the database process. Processing control is then transferred to block 812.

In block 812, the processor determines the database process/time segment pair of the data process that requested access to the data in the data table in block 808. The database process/time segment pair is determined on the basis of the database process and the time segment of the database process determined in block 810. Processing control is then transferred to block 814.

In block 814, the processor determines the data group with which the database process/time segment pair determined in block 812 was associated in block 806. Again, as can be appreciated, and as discussed above, the data table defined in block 802 can be partitioned and the processor alternatively can determine the partition with which the database process/time segment pair determined in block 804 was associated in block 806. Processing control is then transferred to block 816.

In block 816, the processor allows the database process to access the data group that the processor determined was associated with the database process/time segment pair in block 814. Again, as can be appreciated, and as discussed above, the processor alternatively allows the database process to access the partition that the processor determined was associated with the database process/time segment pair in block 814.

While the method of the present invention illustrated in FIG. 8 is directed to controlling access to data stored in a single data table, in another embodiment, which is discussed in detail above, the method of the present invention can be used to control access to data stored in a plurality of data tables.

The foregoing description includes exemplary embodiments of aspects of the present invention. One of ordinary skill in the art will recognize that many further combinations and permutations of aspects of the present invention are possible. The present invention is intended to include all such alterations, modifications and variations that are within the claims.

What is claimed is:

1. A method for controlling access to transactional data in a database management system comprising:
   defining a data table via the database management system, the data table comprising a plurality of data groups, and storing the data table in a computer memory;
   defining and storing in the computer memory a plurality of database process-time segment pairs, each of the plurality of database process-time segment pairs being defined by pairing each of a plurality of transactional database processes with each of a plurality of time segments, each of the plurality of time segments being a duration of time; and
   associating and storing in the computer memory each of the plurality of database process-time segment pairs with at least one of a plurality of data groups of the data table,
   wherein, during a given one of the plurality of time segments, each of the plurality of transactional database processes accesses only one of the plurality of data groups of the data table and, during the given one of the plurality of time segments, each of the plurality of data groups of the data table is accessed by only one of the plurality of transactional database processes.

2. The method of claim 1, further comprising:
   defining and storing in the computer memory a data control table having a plurality of data elements, the plurality of data elements comprising a transactional database process, a time segment, and a data group;
   storing in the data control table each of the database process-time segment pairs; and
   storing in the data control table each of the associations between each of the plurality of the database process-time segment pairs and each of the plurality of data groups.

3. The method of claim 1, wherein the data table is a staging table.

4. The method of claim 1, wherein the data table is a transactional data table that is accessed by a plurality of transactional database processes.

5. A method for controlling access to transactional data in a database management system, the method comprising:
   defining a data table via the database management system, the data table comprising a plurality of data groups, and storing the data table in a computer memory;
   defining and storing in the computer memory a plurality of data group-time segment pairs, each of the plurality of data group-time segment pairs being defined by pairing each of a plurality of data groups with each of a plurality of time segments, each of the plurality of time segments being a duration of time;
   associating and storing in the computer memory each of the plurality of data group-time segment pairs with at least one of a plurality of transactional database processes,
   wherein, during a given one of the plurality of time segments, each of the plurality of transactional database processes accessing only one of the plurality of data groups of the data table and, during the given one of the plurality of time segments, each of the plurality of data groups of the data table is accessed by only one of the plurality of transactional database processes.

6. A method for controlling access to transactional data in a database management system, the method comprising:
   defining a data table via the database management system, the data table comprising a plurality of data groups, and storing the data table in a computer memory;
   defining and storing in the computer memory a plurality of data group-database process pairs via the database management system, each of the plurality of data group-database process pairs being defined by pairing each of a plurality of data groups with each of a plurality of transactional database processes; and
   associating and storing in the computer memory each of the plurality of data group-database process pairs with at least one of a plurality of time segments, each of the plurality of time segments being a duration of time,
   wherein, during a given one of the plurality of time segments, each of the plurality of transactional database processes accessing only one of the plurality of data groups of the data table and, during the given one of the plurality of time segments, each of the plurality of data groups of the data table is accessed by only one of the plurality of transactional database processes.

7. A method of executing a plurality of transactional database processes, the method comprising:
defining a data table via a database management system, the data table comprising a plurality of data groups, and storing the data table in a computer memory;
defining and storing in the computer memory a plurality of database process-time segments pairs, each of the plurality of database process-time segment pairs being defined by pairing each of a plurality of transactional database processes with each of a plurality of time segments, each of the plurality of time segments being a duration of time;
associating and storing in the computer memory each of the plurality of database process-time segment pairs with at least one of a plurality of data groups of the data table;
receiving via the database management system a request that one of the plurality of transactional database processes be given access to the data table;
determining via a computer processor a time segment from among of a plurality thereof for the transactional database process for which access to the data table has been requested;
determining via the computer processor a database process-time segment pair for the transactional database process for which access to the data table has been requested, the database process-time segment pair being determined by the time segment of the transactional database processes for which access to the data table has been requested;
determining via the computer processor the one of the plurality of data groups of the data table with which the database process-time segment pair has been associated; and
allowing access to the one of the plurality of data groups of the data table which was determined to be associated with the database process-time segment pair.

8. The method of claim 7, wherein the step of determining a time segment further comprising:
determining a runtime for the transactional database process for which access to the data table has been requested; and
determining the database process-time segment pair for the transactional database process for which access to the data table has been requested and the determined runtime of the transactional database process.

9. The method of claim 8, wherein the runtime for the transactional database process for which access to the data table has been requested is a clock time.

10. The method of claim 7, wherein the data table comprises a plurality of rows and the transactional database process is an insert process, further comprising:
determining the runtime of the insert process; determining the database process-time segment pair for the insert process and the determined runtime of the insert process;
determining the data group associated with the determined database process-time segment pair; and
inserting via the database management system a row into the data table, wherein the inserted row comprises the determined data group associated with the determined database process-time segment pair for the insert process and the determined runtime of the insert process.

11. The method of claim 8, wherein the transactional database process is a modify process, further comprising:
determining the runtime of the modify process;
determining the database process-time segment pair for the modify process and the determined runtime of the modify process;
determining the data group associated with the determined database process-time e segment pair; and
modifying via the database management system a row in the data table having the data group associated with the determined database process-time segment pair for the modify process and the determined runtime of the modify process.

12. The method of claim 8, wherein the transactional database process is a read process, further comprising:
determining the runtime of the read process;
determining the database process-time segment pair for the read process and the determined runtime of the read process;
determining the data group associated with the determined database process-time segment pair; and
reading via the database management system a row in the data table having the data group associated with the determined database process-time segment pair for the read process and the determined runtime of the read process.

13. The method of claim 8, wherein the transactional database process is a delete process, further comprising:
determining the runtime of the delete process;
determining the database process-time segment pair for the delete process and the determined runtime of the delete process;
determining the data group associated with the determined database process-time segment pair; and
deleting via the database management system a row in the data table having the data group associated with the determined database process-time segment pair for the delete process and the determined runtime of the delete process.

14. A method for controlling access to transactional data in a database management system comprising:
using a computer processor to
define a data table via the database management system, the data table comprising a plurality of data partitions, and store the data table in a computer memory coupled to the computer processor,
define and store in the computer memory a plurality of database process-time segment pairs, each of the plurality of database process-time segment pairs being defined by pairing each of a plurality of transactional database processes with each of a plurality of time segments, each of the plurality of time segments being a duration of time, and
associate and store in a computer memory each of the plurality of database process-time segment pairs with at least one of a plurality of data partitions of the data table,
wherein, during a given one of the plurality of time segments, each of the plurality of transactional database processes accessing only one of the plurality of data partitions of the data table and, during the given one of the plurality of time segments, each of the plurality of data partitions of the data table is accessed by only one of the plurality of transactional database processes.

15. A method for executing a plurality of transactional database processes comprising:
- defining a data table via a database management system, the data table comprising a plurality of data partitions, and storing the data table in a computer memory;
- defining and storing in the computer memory a plurality of database process-time segment pairs, each of the plurality of database process-time segment pairs being defined by pairing each of a plurality of transactional database processes with each of a plurality of time segments, each of the plurality of time segments being a duration of time;
- associating and storing in the computer memory each of the plurality of database process-time segment pairs with at least one of a plurality of data partitions of the data table;
- receiving via the database management system a request that one of the plurality of transactional database processes be given access to the data table;
- determining via a computer processor a time segment from among of a plurality thereof for the transactional database process for which access to the data table has been requested;
- determining via a computer processor a database process-time segment pair for the transactional database process for which access to the data table has been requested, the database process-time segment pair being determined by the time segment of the transactional database processes for which access to the data table has been requested;
- determining via the computer processor the one of the plurality of data partitions of the data table with which the database process-time segment pair has been associated; and
- allowing access to the one of the plurality of data partitions of the data table which was determined to be associated with the database process-time segment pair.

16. A non-transitory computer readable medium for controlling access to transactional data in a database management system, the non-transitory computer readable medium having stored thereon instructions, which when executed by a processor, cause the processor to:
- define a data table via the database management system, the data table comprising a plurality of data partitions, and store the data table in a computer memory;
- define and store in a computer memory a plurality of database process-time segment pairs, each of the plurality of database process-time segment pairs being defined by pairing each of a plurality of transactional database processes with each of a plurality of time segments, each of the plurality of time segments being a duration of time; and
- associate and store in a computer memory each of the plurality of database process-time segment pairs with at least one of a plurality of data partitions of the data table,
- wherein, during a given one of the plurality of time segments, each of the plurality of transactional database processes accessing only one of the plurality of data partitions of the data table and, during the given one of the plurality of time segments, each of the plurality of data partitions of the data table is accessed by only one of the plurality of transactional database processes.

17. A non-transitory computer readable medium for executing a plurality of transactional database processes, the non-transitory computer readable medium having stored thereon instructions, which when executed by a processor, cause the processor to:
- define a data table via a database management system, the data table comprising a plurality of data partitions, and store the data table in a computer memory;
- define and store in a computer memory a plurality of database process-time segment pairs, each of the plurality of database process-time segment pairs being defined by pairing each of a plurality of transactional database processes with each of a plurality of time segments, the plurality of time segments being a duration of time;
- associate and store in a computer memory each of the plurality of database process-time segment pairs with at least one of a plurality of data partitions of the data table;
- receive via the database management system a request that one of the plurality of transactional database processes be given access to the data table;
- determine a time segment from a plurality thereof for the transactional database process for which access to the data table has been requested;
- determine a database process-time segment pair for the transactional database process for which access to the data table has been requested, the database process-time segment pair being determined by the time segment of the transactional database processes for which access to the data table has been requested;
- determine the one of the plurality of data partitions of the data table with which the database process-time segment pair has been associated; and
- allow access to the one of the plurality of data partitions of the data table which was determined to be associated with the database process-time segment pair.

18. A system for controlling access to transactional data in a database management system defining a data table comprising a plurality of data partitions, the system comprising:
- a memory; and
- a processor coupled to the memory and configured to
  - store the data table in the memory,
  - store a plurality of database process-time segment pairs in the memory, each of the plurality of database process-time segment pairs being defined by pairing each of a plurality of transactional database processes with each of a plurality of time segments, each of the plurality of time segments being a duration of time, and
  - store each of the plurality of database process-time segment pairs with at least one of a plurality of data partitions of the data table,
  - wherein, during a given one of the plurality of time segments, each of the plurality of transactional database processes accessing only one of the plurality of data partitions of the data table and, during the given one of the plurality of time segments, each of the plurality of data partitions of the data table is accessed by only one of the plurality of transactional database processes.

19. A system for executing a plurality of transactional database processes comprising:
- a database management system defining a data table comprising a plurality of data partitions;
- a computer memory for storing the data table;
- a computer processor coupled to the computer memory and configured to
  - store in the computer memory a plurality of database process-time segments pairs, each of the plurality of database process-time segment pairs being defined by pairing each of a plurality of transactional database processes with each of a plurality of time segments, each of the plurality of time segments being a duration of time, and store in the computer memory each of the plurality of database process-time segment pairs with at least one of a plurality of data partitions of the data table;

the database management system being configured to receive a request that one of the plurality of transactional database processes be given access to the data table; and the computer processor being further configured to
determine a time segment from among a plurality thereof for the transactional database process for which access to the data table has been requested,
determine a database process-time segment pair for the transactional database process for which access to the data table has been requested, the database process-time segment pair being determined by the time segment of the transactional database processes for which access to the data table has been requested,
determine the one of the plurality of data partitions of the data table with which the database process-time segment pair has been associated, and
allow access to the one of the plurality of data partitions of the data table which was determined to be associated with the database process-time segment pair.

20. A method for controlling access to transactional data in a database management system comprising:
defining a plurality of data tables via the database management system and storing the plurality of data tables in a computer memory;
defining and storing in a computer memory a plurality of database process-time segments pairs, each of the plurality of database process-time segments pairs being defined by pairing each of a plurality of transactional database processes with each of a plurality of time segments, the plurality of time segments being a duration of time; and
associating and storing in a computer memory each of the plurality of database process-time segment pairs with at least one of a plurality of data tables,
wherein, during a given one of the plurality of time segments, each of the plurality of transactional database processes accessing only one of the plurality of data tables and, during the given one of the plurality of time segments, each of the plurality of data tables is accessed by only one of the plurality of transactional database processes.

21. A method of executing a plurality of transactional database processes, the method comprising:
defining a plurality of data tables via a database management system, and storing the plurality of data tables in a computer memory;
defining and storing in the computer memory a plurality of database process-time segment pairs, each of the plurality of database process-time segment pairs being defined by pairing each of a plurality of transactional database processes with each of a plurality of time segments, the plurality of time segments being a duration of time;
associating and storing in the computer memory each of the plurality of database process-time segment pairs with at least one of a plurality of data tables;
receiving via the database management system a request that one of the plurality of transactional database processes be given access to the data in the plurality of the data tables;
determining via a computer processor a time segment from among a plurality thereof for the transactional database process for which access to the data in the plurality of data tables has been requested;
determining via the computer processor a database process-time segment pair for the transactional database process for which access to the data in the plurality of data tables has been requested, the database process-time segment pair being determined by the time segment of the transactional database processes for which access to data in the plurality of data tables has been requested;
determining via the computer processor the one of the plurality of data tables with which the database process-time segment pair has been associated; and
allowing access to the one of the plurality of data tables which was determined to be associated with the database process-time segment pair.

* * * * *

UNITED STATES PATENT AND TRADEMARK OFFICE
CERTIFICATE OF CORRECTION

PATENT NO.         : 9,104,674 B1
APPLICATION NO.    : 12/760383
DATED              : August 11, 2015
INVENTOR(S)        : Thomas Edward Young, Sr.

It is certified that error appears in the above-identified patent and that said Letters Patent is hereby corrected as shown below:

In the Claims

| | |
|---|---|
| Column 18, Line 8 | Delete: "process-time e segment pair; and" |
| CLAIM 11 | Insert: --process-time segment pair; and-- |
| | |
| Column 20, Line 58 | Delete: "data table;" |
| CLAIM 19 | Insert: --data table; and-- |

Signed and Sealed this
Twenty-third Day of August, 2016

Michelle K. Lee
*Director of the United States Patent and Trademark Office*